(12) United States Patent
Early et al.

(10) Patent No.: US 6,413,077 B1
(45) Date of Patent: Jul. 2, 2002

(54) LASER IGNITION

(75) Inventors: James W. Early, Los Alamos; Charles S. Lester, San Juan Pueblo, both of NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/676,464

(22) Filed: Sep. 29, 2000

Related U.S. Application Data

(60) Division of application No. 09/267,122, filed on Mar. 9, 1999, which is a continuation-in-part of application No. 08/861,214, filed on May 21, 1997, now abandoned.
(60) Provisional application No. 60/044,483, filed on Apr. 21, 1997.

(51) Int. Cl.$^7$ ................................ F23Q 21/00
(52) U.S. Cl. ............... 431/1; 431/6; 431/258; 123/143 B; 123/DIG. 9; 60/39.821; 372/23; 372/25
(58) Field of Search ............ 431/1, 2, 6, 258; 123/143 R, 143 B, DIG. 9; 60/39.06, 39.821; 372/69–72, 92–94, 23, 25, 97

(56) References Cited

U.S. PATENT DOCUMENTS

| | | |
|---|---|---|
| 3,427,118 A | 2/1969 | Andress et al. |
| 3,902,036 A | 8/1975 | Zaleckas |
| 4,302,933 A | 12/1981 | Smith |
| 4,416,226 A | 11/1983 | Nishida et al. |
| 4,434,753 A | 3/1984 | Mukainakano et al. |
| 4,665,529 A | 5/1987 | Baer et al. ................. 372/107 |
| 4,702,808 A | 10/1987 | Lemelson |
| 4,870,244 A | 9/1989 | Copley et al. |
| 4,947,640 A | 8/1990 | Few et al. |
| 5,157,676 A | 10/1992 | Wilcox |
| 5,202,893 A * | 4/1993 | Kubota et al. ................. 372/69 |
| 5,206,455 A | 4/1993 | Williams et al. |
| 5,325,393 A * | 6/1994 | Nighan, Jr. et al. ........... 372/97 |
| 5,328,665 A | 7/1994 | Geiger |
| 5,367,869 A | 11/1994 | DeFreitas |
| 5,404,712 A | 4/1995 | Few et al. |
| 5,485,720 A | 1/1996 | Few et al. |
| 5,497,612 A | 3/1996 | Few et al. |
| 5,568,503 A | 10/1996 | Omori ......................... 372/70 |
| 5,608,742 A * | 3/1997 | Petersen ....................... 372/6 |
| 5,708,672 A * | 1/1998 | Pessot et al. ................. 372/70 |
| 5,756,924 A | 5/1998 | Early |
| 6,081,369 A * | 6/2000 | Waarts et al. ................. 372/70 |

\* cited by examiner

*Primary Examiner*—Sara Clarke
(74) *Attorney, Agent, or Firm*—Gemma Morrison Bennett

(57) ABSTRACT

In the apparatus of the invention, a first excitation laser or other excitation light source capable of producing alternating beams of light having different wavelengths is used in tandem with one or more ignitor lasers to provide a compact, durable, engine deployable fuel ignition laser system. Reliable fuel ignition is provided over a wide range of fuel conditions by using the single remote excitation light source for pumping one or more small lasers located proximate to one or more fuel combustion zones with alternating wavelengths of light.

37 Claims, 3 Drawing Sheets

LASER IGNITION

This application is a divisional of patent application Ser. No. 09/267,122 which is a continuation in part of patent application Ser. No. 08/861,214 filed May 21, 1997, which had benefit of Provisional Patent Application No. 60/044,483 filed Apr. 21, 1997.

This invention was made with government support under Contract No. W-7405-ENG-36 awarded by the U.S. Department of Energy. The government has certain rights in the invention.

TECHNICAL FIELD

This invention relates to a method and apparatus for laser ignition.

BACKGROUND ART

Laser light has been used to initiate the ignition of fuel/oxidizer mixtures by use of laser-spark, air-breakdown ignition methods in which a single, high peak power laser light pulse from a Q-switched laser is used to initiate fuel ignition by generating high temperatures and an ionization plasma. These laser ignition methods and apparatuses are generally unreliable except within narrow ranges of fuel parameters such as fuel/oxidizer ratios, fuel droplet size, number density and velocity within a fuel aerosol, and initial fuel and air temperatures.

After initial ignition, sustaining ignition of fuel/oxidizer mixtures is typically accomplished by use of a laser light pulse from a Q-switched laser with a pulse width and pulse energy which will provide the peak power density required to initiate plasma formation and to satisfy concurrently the need for time-averaged power for sustaining the ignition. This requires fragile, bulky laser excitation sources such as flashlamps or laser diodes which are often difficult to fit proximate to fuel combustion zones, particularly in fuel combustion zones in places such as aircraft engines. Fuel combustion zones are usually harsh, mechanically adverse environments that necessitate sturdy design or frequent replacement of ignition devices subjected to those environments.

Thus there is still a need for a laser ignition process which can reliably ignite gaseous or aerosol fuel mixtures within a broad range of parameters such as fuel/oxidizer ratios, fuel droplet size, number density and velocity within a fuel aerosol, and initial fuel temperatures as well as a need for means for ignition within small spaces under mechanically adverse conditions.

Therefore, it is an object of this invention to provide a reliable ignition method and apparatus.

It is another object of this invention to provide a method and apparatus for laser ignition of gaseous or aerosol fuel mixtures within a broad range of parameters such as fuel/oxidizer ratios, fuel droplet size, number density and velocity within a fuel aerosol, and initial fuel temperatures.

It is yet another object of this invention to provide an economical method and apparatus for laser ignition of gaseous or aerosol fuel mixtures.

It is a further object of this invention to provide a method and apparatus for laser ignition of gaseous or aerosol fuel mixtures within small spaces under mechanically adverse conditions.

It is yet a further object of this invention to provide a method and apparatus for elimination of fragile and bulky laser excitation sources such as flashlamps or laser diodes from fuel igniting lasers located proximately to fuel combustion zones.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims which are intended to cover all changes and modifications within the spirit and scope thereof.

DISCLOSURE OF INVENTION

To achieve the foregoing and other objects, and in accordance with the purposes of the present invention, as embodied and broadly described herein, there has been invented a fuel ignition apparatus and method in which an excitation light source is used to activate one or more small ignitor lasers located remotely from the excitation light source and more proximately to one or more fuel combustion zones. Using a separate excitation light source to pump the lasers which ignite the fuel eliminates the need for large, heavy, fragile or complex excitation sources in the harsh operating environments of fuel combustion chambers. Durable, reliable, economical ignition of gaseous or aerosol fuel mixtures can be accomplished with the invention apparatus and method.

In a fifth embodiment of the invention, a light source capable of producing more than one wavelength of light is used as the excitation light source for activating a remote ignitor laser and sustaining a breakdown plasma in fuel. Two different wavelengths of light the second of which is not within the absorption band of either the laser rod or Q-switch of the ignitor laser, are sequentially injected into a single optical fiber and transported to the remote ignitor laser. The pulse of light with the wavelength which is absorbable by the laser rod is compressed by the Q-switched ignitor laser to produce an ignitor laser output of a short duration high peak power pulse that is focused into a focal point in an aerosol spray or cloud of combustible fuel, thereby forming a breakdown plasma. The subsequent pulse of light having the wavelength which is not absorbable by the laser rod or Q-switch passes unimpeded through the ignitor laser as a long duration low peak power beam is also focused into the focal point in the aerosol spray or cloud of the combustible fuel to sustain the plasma formed by contact of the short duration high peak power pulse with the fuel.

The invention apparatus of this embodiment can have an optical switching feature positioned to receive output of a single excitation light source and to direct beams in an ordered sequence or in a random sequence through beam splitters into pairs of first and second optical fibers, each pair of which is associated with an ignitor laser.

BRIEF DESCRIPTION OF THE DRAWINGS

The accompanying drawings, which are incorporated in and form a part of the specification, illustrate five preferred embodiments of the present invention and, together with the description, serve to explain the principles of the invention. In the drawings.

BEST MODES FOR CARRYING OUT THE INVENTION

Figure 1:
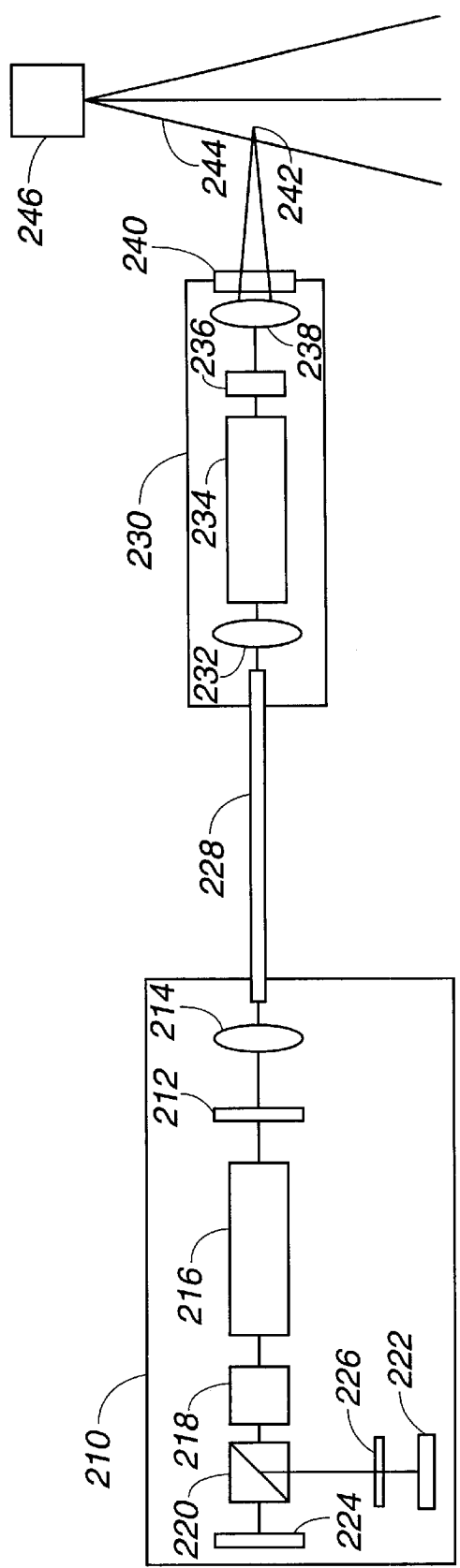
FIG. 1 is a schematic diagram of a fifth embodiment of the invention which employs a plurality of wavelengths of excitation light and operates without use of an optical delay line or splitting of the beam from the remote excitation light source.

The invention ignition method utilizes a combination of short and long duration light pulse lengths from a single excitation light source and one or more lasers, or two or more lasers in series, to provide fuel ignition performance which is superior to conventional laser-based methods with respect to reliability, laser energy efficiency and insensitivity to fuel/air composition and fuel temperatures.

Dual pulse ignition such as that described in U.S. Pat. No. 5,756,924 can be accomplished using the apparatus and methods of this invention. Dual pulse ignition requires application of a short duration high peak power laser pulse to an aerosol spray or cloud of fuel to generate an air-breakdown plasma within the fuel, followed by application of a second, lower peak power, longer duration laser pulse to sustain the plasma and achieve efficient fuel ignition. Unique laser pulse temporal formats and sequencing are necessary.

In each embodiment of the present invention, a single excitation light source is used to provide low peak power long duration pulses of excitation light to one or more small ignitor lasers located more proximately than the excitation light source to one or more fuel combustion zones. By serving as a pulse compressor, the small ignitor laser or lasers provide high peak power short duration laser light pulses for the air-breakdown plasma formation in the fuel aerosol spray or cloud. Long duration low peak power pulses from the excitation light source sustain the air-breakdown plasmas for efficient and stable ignition.

Thus, the light from the excitation light source serves a dual role: (a) providing light for excitation of the ignitor laser; and (b) providing light for energizing and sustaining the plasma produced in the fuel by light from the ignitor laser.

The excitation light source generally is a laser, but may also be a light emitting diode or a flashlamp. Any of a variety of laser systems may be used as an excitation laser light source. For example, excitation laser light may be generated by a Q-switched, cavity dumped or free running laser. For the fifth embodiment of the invention, an excitation light source which can produce more than one wavelength of light is needed.

Q-switched pulses can be obtained from the excitation laser by either active or passive Q-switching of the laser. Excitation lasers which are active or passive Q-switched can be used for all four embodiments of the invention. Generally presently preferred, particularly for the third, fourth and fifth embodiments of the invention, are active Q-switched solid-state laser systems to reduce timing jitter.

A wavelength tunable, Q-switched Cr:LiSAF laser that can be tuned over a wavelength range from about 800 to about 1000 nanometers is presently preferred. The output of such a laser can be tuned to a wavelength of 808 nanometers, which is a wavelength that can efficiently pump a Nd:YAG ignitor laser rod and many other Nd-doped host laser materials that would be used in a Nd:YAG ignitor laser.

Other good choices for the excitation laser are: an alexandrite laser operating at 750 nanometers, which can also be used to pump a Nd:YAG ignitor laser; or a Ti:sapphire laser. Other tunable lasers or light emitting diodes or flashlamps can be employed as excitation light sources in the practice of the invention, depending upon specific ignition conditions and the type of ignitor laser employed.

The excitation laser may be energized by flashlamps or diodes. The excitation laser may be cooled by any suitable means such as water cooling, air cooling, or thermo-electric cooling.

For all embodiments of the invention, the excitation laser can be operated in continuous or pulsed mode. Pulsed mode is generally preferred for economics of energy. A summary of the operating parameters for the excitation laser in the fifth embodiment of the invention are shown in Table 5.

Any wavelength in the range from the ultraviolet to the infrared portion of the light spectrum could be useful for the longer duration lower peak power pulse from the excitation light source, depending upon the choice of laser material for the ignitor laser, the type of fuel, and the combustion conditons. The excitation light source must be operated at a wavelength within the range which is absorbed by the laser material utilized as the active lasing medium of the ignitor laser. Absorption of the excitation light by the ignitor laser material is required for energizing the laser material of the ignitor laser. Generally, for the portion of the light from the excitation light source used to sustain the plasma, longer wavelengths up to about 12 microns of light are preferred.

The light pulse from the excitation light source must be of sufficient peak power to efficiently pump the plasma generated by the ignitor laser, but need be of no greater peak power. A peak power of greater than 70 kW is generally sufficient, depending upon the type of fuel used and combustion environment conditions.

Generally presently preferred excitation light pulse energy is in the range from about 50 to about 300 mJ, depending upon fuel conditions and the type of ignition to be performed.

The duration or temporal length (pulse width) of the ignitor laser light pulse appropriate for the plasma generation function generally may be anywhere from 10 or fewer nanoseconds to about 200 nanoseconds in duration, depending upon the light pulse energy available. The temporal length of the long duration lower peak power laser pulse from the excitation laser light source is preferably at least as large or larger than that of the short duration higher peak power laser pulse from the ignitor laser. Presently preferred are excitation laser light pulse lengths in the range between about 50 and about 1 microsecond, depending upon the laser pulse energy.

In the fifth embodiment, the two different wavelengths of light from the excitation light source can be of the same or different intensities. In the fifth embodiment of the invention, the beam or beams from the excitation light source are not split, but are delivered trough a single optical fiber to the ignitor laser in the selected sequenced pulse format.

Presently preferred optical fibers are multiple-mode optical fibers, but multiple fiber bundles can also be used for transporting the laser light pulses. Single mode optical fibers are generally not as useful because the smaller fibers cannot carry the high peak power needed. A multiple-mode fiber with a core diameter in the range from about 50 microns to about 1 millimeter generally can accommodate transport of the typical peak power without damage to the optical fiber. Multiple-mode fibers with core diameters of about 400 microns are presently preferred because these are large enough to carry the high peak power needed without damage to the optical fiber.

A taper at the input end of the optical fiber can be used to enhance efficiency of light injection and inhibit fiber damage.

Any suitable device can be used for combining the beams, including, but not limited to, beam combiners, reflective devices and optical fiber couplers.

The ignitor laser or lasers for any of the embodiments of this invention can be and generally is a modified laser having a laser rod, optical resonator cavity, and a Q-switch, but little else.

The ignitor laser needs no pumping diodes or flashlamps because it is pumped by light coming through at least one fiber optic line from the excitation light source. Thus the ignitor laser can be a small, durable unit which can withstand a harsh fuel ignition environment.

Passive Q-switched ignitor lasers are presently preferred because of the high voltage needed for active Q-switching. High voltage in the proximity of a fuel combustion zone is undesirable because of maintenance and safety problems associated with high voltage in the fuel combustion zone.

The ignitor laser rod (lasing medium) can be made of any Q-switchable, solid-state laser material which will provide light output within the desired wavelength and peak power range. Although many types of solid-state lasing material can be employed for the active lasing medium, neodymium doped yttrium aluminum garnet (Nd:YAG) is presently preferred because of its economy and good thermal properties. Neodymium doped yttrium aluminum garnet lases at a wavelength of 1064 nanometers. Other useful ignitor laser rod materials include, but are not limited to, Cr:Nd:GSGG, Nd:glass or neodymium doped yttrium lithium fluoride (Nd:YLF).

The resonant cavity of the ignitor laser can be of either stable or unstable configuration and is bounded by light reflective coatings placed upon optical surfaces. The coated optical surfaces may be curved or flat, depending upon cavity configuration (stable or unstable). A first coating can be upon the surface of the collimating lens facing the input end of the ignitor lasing rod or upon the input end of the ignitor lasing rod. The first coating must be of a dichroic nature, that is, highly reflective for lasing wavelengths and highly transmissive for the excitation wavelengths. A second coating is generally placed upon the output end of the Q-switch to form an output coupling reflector for the selected wavelength of light.

The size of the ignitor laser rod can vary greatly, depending upon the application.

The diameter of the Q-switch is preferably matched to the rod diameter with thickness of the Q-switch depending upon the dopant level needed for the selected optical density.

All components of the ignitor laser can be mounted in a cylindrical tube to become a virtually monolithic unit. Metal or ceramic material is generally considered most suitable for the ignitor laser encasement, although other materials can be used with good results.

For aircraft applications ignitor laser rods with a length in the range from 0.5 to no more than 20 centimeters and with a rod diameter from about 1 mm to 10 or more millimeters are generally preferred, depending upon the absorptive properties of the rod to the excitation light and the maximum pulse energy desired. Presently preferred dimensions of an ignitor laser to be used for aircraft engine ignition are in the range from 1 to 12 centimeters in length and from 1 to 6 millimeters in diameter. These smaller ignitor lasers are preferred because larger sizes would defeat the purposes of having a small, economical, easily positioned ignitor laser which directly replaces the currently used capacitive discharge spark ignitor.

The ignitor laser can be cooled by any suitable means such as air cooling, circulated water cooling, thermal-electric cooling, or use of phase transition material. Air cooling is presently preferred because of the simplicity, economy and ignitor dimensions.

For each of the embodiments of the invention it is generally presently preferred that the ignitor laser be operated in pulsed mode.

The ignitor laser is used to produce laser light having temporal lengths or pulse widths in the range from about 1 to about 60 nanoseconds, with pulse energies in the range from about 10 mJ to about 250 mJ being presently preferred, depending upon type of fuel used and combustion temperatures.

Which wavelengths from the ignitor laser are most effective depends upon the fuel breakdown processes. Resonant excitation and ionization of the fuel/oxidizer components are typically obtained by utilizing short light wavelengths which are preferred due to the greater efficiency in the ionization yield. For non-resonant ionization of fuel/oxidizer components, wavelengths from as short as 200 nanometers to as long as 12 microns can be effectively used depending upon choice of fuel. Generally presently preferred for most common fuels are wavelengths in the infrared range from about 700 nanometers to about 3 microns.

Operating parameters for the ignitor laser or lasers in each embodiment of the invention are shown in Table 1.

A short focal length lens is positioned to focus the output of the ignitor laser into the fuel region to be ignited. Short focal lengths are generally preferred because the longer the focal length, the larger the spot size, which, for efficient operation of the invention, is limited by the minimum power density required to break down the fuel at the focal point. The focal length of this lens can be anywhere in the range from about 1 cm to about 100 cm, although for aircraft engine ignition applications, a focal length in the range from about 5 to about 30 cm is presently preferred.

If desired, a laser window can be used to protect the ignitor laser focal lens from combustion chamber products.

Other methods for introducing a temporal delay between these two pulses, including the use of reflective or diffractive multiple pass delay lines, can effectively serve the same role.

Any suitable device can be used for combining the beams including, but not limited to, beam combiners, reflective devices and optical fiber couplers.

In the embodiment of the invention claimed herein, a single excitation light source that can produce two laser pulses, each with a different wavelength of light, is used for: (a) excitation of at least one ignitor laser; and (b) to sustain the breakdown plasma in a focal point in an aerosol spray or cloud of combustible fuel. An example of this [fifth] embodiment of the invention is shown in FIG. 1, and as detailed in Example 1.

In this embodiment, two beams (pulses) of long duration low peak power light from the excitation light source are produced by any suitable means. A laser with an electro-optic Q-switch is presently preferred for producing the two beams by sequentially operating the laser in free-running and Q-switched modes. Active double Q-switched lasers are presently preferred as excitation light sources for the fifth embodiment of the invention. Alternatively, any other light source capable of producing alternately sequenced beams of two different wavelengths of light can be used. Also, two separate excitation light sources can be used.

A birefringement filter, Brewster plate, prism, or other wavelength selecting device can be used between the polarization analyzer and reflecting mirror as needed to fine tune the lasing wavelength.

The first pulse or beam from the excitation light source must be of a wavelength that is capable of being absorbed by the ignitor laser rod so as to pump the ignitor laser. This first pulse of long duration low peak power light from the excitation light source is injected into an optical fiber which transports the beam to the ignitor laser.

As with other embodiments of the invention, the multimode optical fiber may be a tapered fiber to facilitate beam alignment or a fiber bundle may be used. A multimode fiber with a core diameter of 200 microns or greater is presently preferred.

At the ignitor laser the first beam is directed into the laser rod of the ignitor laser to energize the ignitor laser. The ignitor laser then outputs a short duration high peak power Q-switched laser light pulse. Output of the short duration high peak power laser light pulse from the ignitor laser is directed through a focusing lens such as that described for the first embodiment into a focal point in an aerosol spray or cloud of fuel. At the focal point the short duration high peak power laser light pulse from the ignitor laser breaks down and ionizes the combustible fuel, forming a plasma.

The second pulse of excitation light must be of a wavelength that can be transported through the ignitor laser without absorption by the laser rod and Q-switch of the ignitor laser. Thus, the second pulse of excitation light passes unimpeded through the ignitor laser and is focused through the same lens used to focus the short duration high peak power ignitor laser output into the focal point in the aerosol spray or cloud of fuel. The long duration low peak power second pulse sustains the breakdown plasma in the combustion zone.

Pulse widths or temporal durations, wavelengths, peak powers and pulse energies which are generally most useful in operating the excitation light source and ignitor laser or lasers of the fifth embodiment of the invention are set forth in Table 1.

TABLE 1

Operating parameters for the ignitor laser or lasers in each embodiment of the invention are shown in Table 1.

| Operating Feature | Broad Range | Intermediate Range | Narrow Range |
|---|---|---|---|
| Excitation Laser | | | |
| Pulse Sequence: alternating first and second pulses | | | |
| Long Wavelength | 200 nm–12μ | 400 nm–5μ | 600 nm–2μ |
| Short Wavelength | 200 nm–12μ | 400 nm–5μ | 600 nm–2μ |
| Peak Power | First λ: 10 W–50 MW | 40 W–6 MW | 150 W–2.5 MW |
| | Second λ: 20 kW–40 MW | 100 kW–10 MW | 300 kW–6 MW |
| Pulse Energy | First λ: 10 mJ–500 mJ | 20 mJ–300 mJ | 50 mJ–250 mJ |
| | Second λ: 10 mJ–400 mJ | 20 mJ–250 mJ | 50 mJ–100 mJ |
| Pulse Width | First λ: 10 ns–1 ms | 50 ns–500 μs | 100 ns–300 μs |
| | Second λ: 10 ns–500 ns | 25 ns–200 ns | 50 ns–150 ns |
| Delay Between Pulses | 25 ns–300 μs | 50 ns–200 ns | 50 ns–150 ns |
| Ignitor Laser | | | |
| Pulse Sequence: single output pulse from | | | |
| Wavelength | 200 nm–12μ | 400 nm–5μ | 800 nm–2μ |
| Peak Power | 25 kW–250 MW | 100 kW–30 MW | 800 kW–10 MW |
| Pulse Energy | 5 mJ–250 mJ | 10 mJ–150 mJ | 25 mj–100 mJ |
| Pulse Width | 1 ms–200 ns | 5 ns–100 ns | 10 ns–30 ns |
| Delay Between Pulses | | | |

In any of the embodiments described, more than one ignitor laser can be used with a single excitation light source.

Multiple ignitor laser configurations are desirable for applications in which multiple ignitors are required for each engine combustion chamber or where multiple combustion chambers or engines are used. The smaller, stripped down ignitor lasers can be placed proximate to the fuel jets for each of the cylinders of an aircraft engine and a single remote excitation light source used to power the smaller ignition lasers. The smaller, low-cost ignition lasers with no pumping elements such as flashlamps or diode lasers, and with no electro-optic devices, can be built to tolerate the extreme temperature variations and vibrations in the engine operating environment while the more expensive, more fragile excitation light source laser is safely positioned in the fuselage of the aircraft.

The capability of multiplexing an excitation light from the excitation light source with several different ignitor lasers reduces the cost that would be associated with having to have two excitation light sources at each of the combustion chambers of an aircraft and the cost that would be associated with maintenance of fragile, temperature sensitive and expensive excitation light sources, such as flashlamps or diode lasers in the extreme environments of combustion chambers.

To achieve this multiplexing function, an optical switching system is used to sequentially direct excitation light from the single excitation light source into multiple pairs of optical fibers, with each pair of optical fibers connected to an individual ignitor laser.

Any suitable means for optical switching can be used. Electro-optically controlled means such as that described in patent application Ser. No. 60/076,301 can be successfully employed for optical switching in the invention. Although electro-optical switching is presently preferred, various mechanical switching systems can be employed in any of the embodiments of the invention. For example, multiplexing systems based upon a rotatable prism can be utilized.

EXAMPLE I

An example of the embodiment of the invention claimed herein is shown in the schematic diagram in FIG. 1. In this example of the invention, the excitation laser is operated to produce two sequential low peak power pulses having two different wavelengths.

Wavelengths of 808 nanometers and 850 nanometers were selected because the Nd:YAG rod of the ignitor laser will absorb the 808 nm wavelength and will not absorb the 850 nm wavelength light.

In the excitation laser 210 for this embodiment, an output coupler 212 is positioned between the output focusing lens 214 and the laser rod 216. A Pockels cell 218 is positioned to receive light from the laser rod 216 and direct the light from the laser rod 216 into a polarization analyzer 220.

The excitation laser 210 contains two end mirrors 222, 224 that are dielectric coated so as to select the particular wavelength at which the excitation laser will operate. End mirror 222 is coated for high reflectivity at 808 nanometers; end mirror 224 is coated for high reflectivity at 850 nanometers.

The mirror reflecting light employed at any given time is determined by the voltage applied to the Pockels cell 218. When no voltage is applied to the Pockels cell 218, the polarization of the light is unchanged and all the laser light is directed to end mirror 222 through the polarization analyzer 220 to laser rod 216. Output of laser rod 116 goes to an output coupler 212, thusly producing laser output with a wavelength of 808 nm. The output coupler 212 is a broad-band reflector with a reflectivity in the range from about 30% to about 70%.

A brewster plate 226, birefringement filter, or other wavelength tuning element can be positioned between the polarization analyzer 220 and the reflecting end mirror 222 to fine tune the lasing wavelength.

Typically, the excitation laser 210 outputs a first pulse with a duration of about 50 nanoseconds to about 300 microseconds at the selected 808 nm wavelength. Typical peak power for the first excitation laser pulse is from about 1 kW to about 1 MW.

Once the ignitor laser 230 has been fully energized by the first light pulse and the ignitor laser 230 has Q-switched, voltage is quickly applied to the Pockels cell 218. The magnitude of this voltage generally is equal to the voltage of the Pockels cell 218, i.e., a halfwave voltage of about 3,500 V. When the halfwave voltage is applied to the Pockels cell 218, the polarization of the light is changed by 90°. The polarization analyzer 220 will direct all the light of the second pulse to end mirror 224 and a Q-switched pulse with a wavelength of 850 nm and a duration in the range from about 50 to about 200 ns is produced by the excitation laser. Typical peak power for the second excitation laser pulse is from about 100 kW to about 10 MW.

The light pulses from the excitation light source laser 210 are focused through a short focal length lens 214 into a single multiple-mode optical fiber 228 a core diameter of about 400 microns and with a taper at the input end. The multiple-mode optical fiber 228 transports both excitation laser light pulses sequentially to the ignitor laser 230.

The configuration of the ignitor laser 230 is the same as that described in Example I. Light from the optical fiber 228 is focused into the ignitor laser 230 through a lens 232 into the ignitor laser rod 234 and thence to the passive Q-switch 236 of the ignitor laser 230.

The first 808 nm wavelength pulse from the excitation light laser 210 is absorbed by the ignitor laser rod 234 and energizes the ignitor laser 230, thereby producing a short duration high peak power pulse of laser light. The short duration high peak power pulse from the ignitor laser 230 is focused through a focusing lens 238, then through a laser window 240 to a preselected position or focal point 242 within the fuel spray 244 from a fuel nozzle 246 in the combustion zone. A breakdown plasma is produced at the focal point 242 by the first 808 nm wavelength pulse of light.

The interval between the end of the first pulse and the start of the second pulse is typically from about 50 to about 200 ns.

After the selected interval between the two pulses, the second 850 nm wavelength pulse from the excitation light laser 210 is similarly transported to the ignitor laser 230. However, since the 850 nm wavelength of the second pulse of light is not within the absorption band of either the laser rod 234 or Q-switch 236, the collimated light of the second pulse passes unimpeded through each of the ignitor laser components. The lens 238 focuses the 850 nm wavelength light which has passed through the ignitor laser 230 and through the laser window 240 to the focal point 242 within the fuel spray 244 from the fuel nozzle 246 in the combustion zone. This second long duration low peak power pulse sustains the ignition of the fuel/air plasma induced earlier by the short duration high peak power pulse from the ignitor laser 230.

EXAMPLE II

Figure 2:
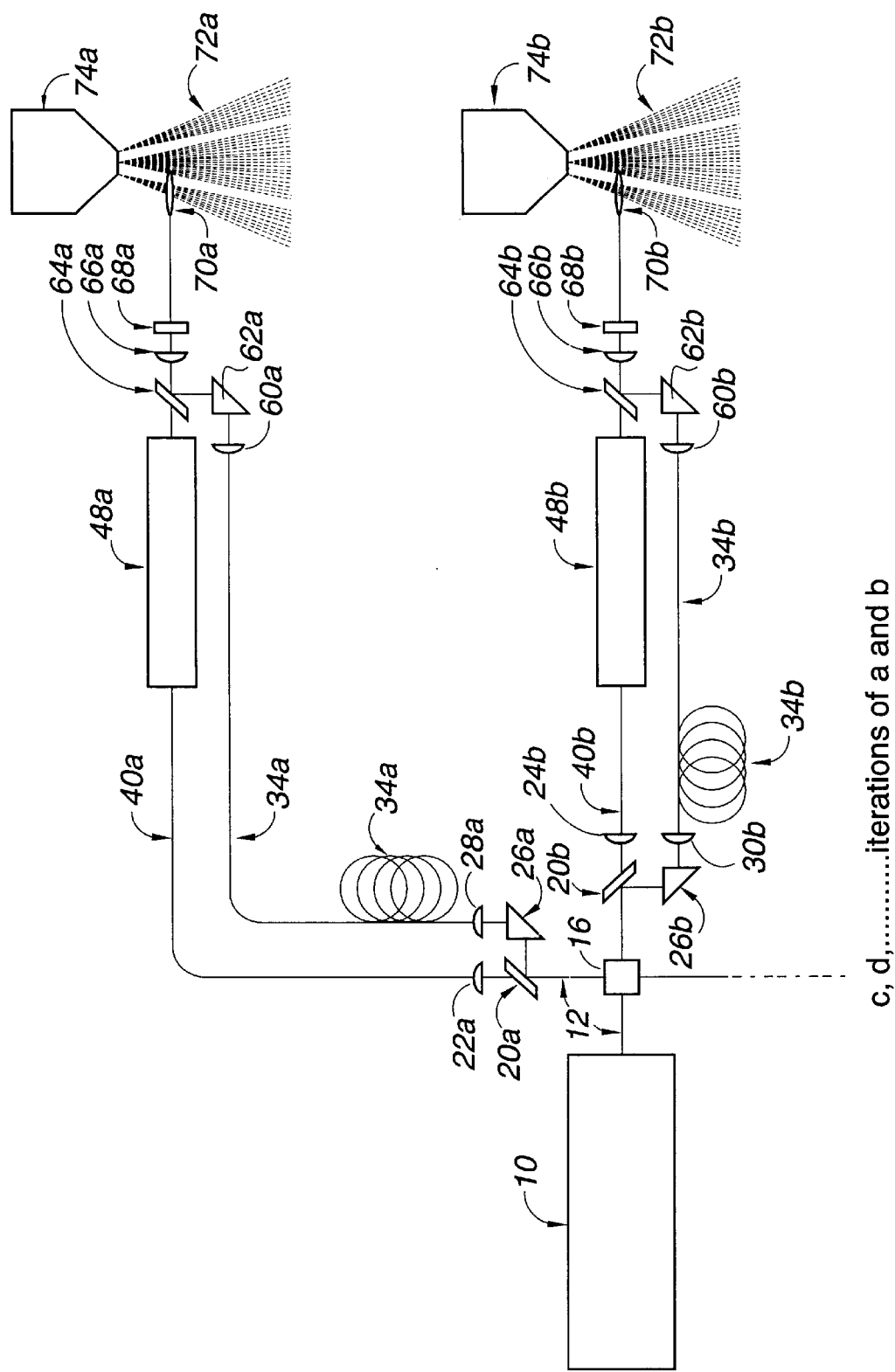
FIG. 2 is a schematic diagram of a multiplexed laser ignition system in accordance with the invention.

A schematic of a mechanically multiplexed arrangement of the ignition lasers in a sixth embodiment of the invention is shown in FIG. 2. As depicted in FIG. 2, a single excitation light source laser 10 is used to provide low peak power long duration light pulse energy for several ignitor lasers 48a, 48b, . . . The excitation laser light 12 is directed into a beam multiplier 16 or other means for optical switching of the excitation laser tight beam 12 in random or ordered sequence from one pair of optical fibers 34a and 40a to another 34b and 40b, and to as many other pairs of optical fibers as are used.

The laser light is transported by each of the pairs of optical fibers to an ignitor laser 48a, 4b, . . . and a beam combiner 64a, 64b, . . . and thence through an additional lens 66a, 66b, . . . into the focal point 70a, 70b, . . . in a fuel spray 72a, 72b, . . . as would be used with the first embodiment of the invention and shown in FIG. 2. Alternatively, the laser light transported by each pair of optical fibers is directed into a beam combiner before injection into the ignitor laser associated with each of the pairs of optical fibers.

EXAMPLE III

Figure 3B:
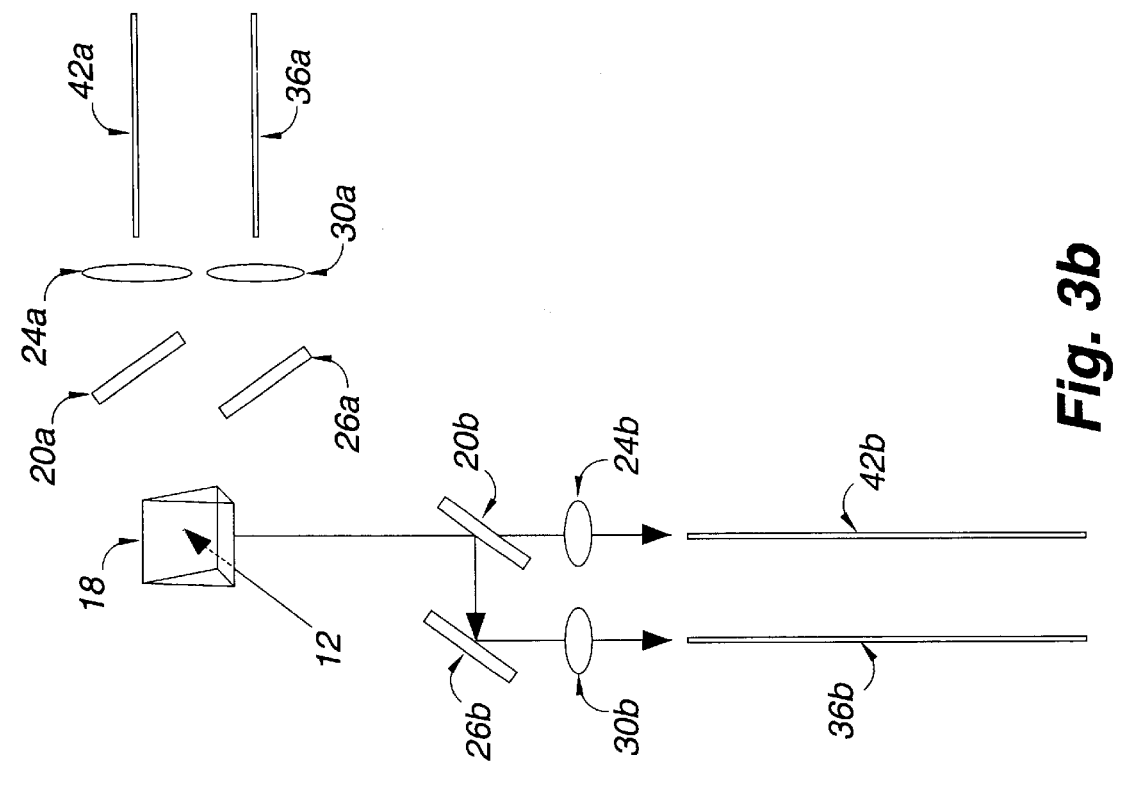
FIGS. 3a and 3b are schematic diagrams of two steps of the sequential operation of an optical switching system such as one which can be used in the embodiment of the invention shown in FIG. 2.
Figure 3A:
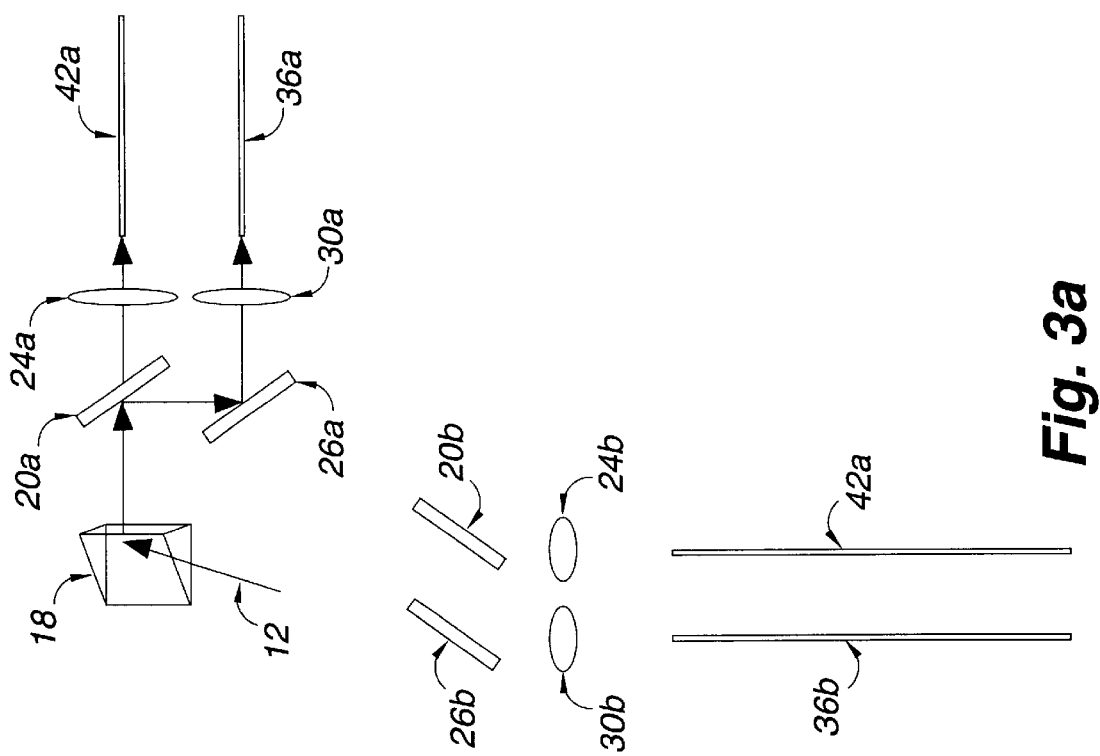

A presently preferred simple and economical optical switch which can be used in the multiplexed embodiment of the invention described in Example III is based upon a rotatable 90-degree prism 18 as shown in FIGS. 3a and 3b.

With reference to FIG. 3a, excitation light 12 is directed into the lower (bottom) face of the prism 18 where the excitation light is reflected through a 90° angle. Excitation light exiting the prism 18 is then directed to a beam splitter 20a where the excitation laser light is split into two equal intensity beams. The two beams are then focused through lenses 24a and 30a, and injected into two optic fibers 36a and 42a, one of which transports laser light directly to the ignitor laser and the second of which is an optical delay line. The optical fibers 36a and 42a transport the excitation light to a first single ignitor laser in a manner substantially identical to that described for either the first or second embodiment of the invention, each of which has a first multiple-mode optical fiber and a fiber optic delay line transporting excitation light in sequential pulses to an ignitor laser.

With reference to FIG. 3b, to excite a second ignitor laser, the same prism 18 is rotated to another angular position so that the excitation light is directed to a second beam splitter 20b which then directs excitation light to a second pair of optical fibers 36b and 42b that transport excitation light to the second ignitor laser.

Likewise, third, fourth, and more ignitor lasers can be powered by the single excitation laser light source 10, by rotating the prism 18 through more angles to direct laser light through other beam splitters into other pairs of optical fibers that take sequential pulses of laser light to each of the other ignitor lasers in sequential turns. In this manner, numerous remotely located ignitor lasers can be energized sequentially by a single excitation light source.

EXAMPLE IV

In each of the embodiments of the invention, the small physical size and simplicity of design of the ignitor laser enables an effective, compact, robust and cost effective laser ignitor package which is about the same size as the spark plug which it replaces in various combustion applications.

The multiplexed embodiments of the invention are particularly useful for aerospace fuel ignition applications. The laser ignition hardware of this invention is suitable for use in harsh aerospace operating environments because it is compact, insensitive to engine vibrations, and is able to withstand extreme temperature variations. There is no need to provide bulky and fragile excitation sources such as flash lamps or light emitting diodes at the ignitor laser proximate to the ignition site. Instead, bulky and fragile excitation sources are located at the excitation light source, which can be located within the aircraft cabin or other remote location away from the propulsion engine. The reduced size of the ignition equipment at the engine reduces cooling requirements and reduces sensitivity to both vibrations and temperature.

No electrical connections of any kind are required to operate the invention apparatuses. Therefore, problems with high voltage containment at the engine, which are experienced with the failure of conventional capacitive discharge type ignitors (spark plugs) are eliminated.

Because the ignitor lasers are basically monolithic units with no need for excitation sources such as flash lamps or light emitting diodes, virtually all maintenance is confined to the single excitation light source which can be placed in an easily accessible location. Since the excitation light source is located remotely from the ignition site, its environment can be more stringently controlled and the size of the excitation light source is less likely to be problematic.

While the apparatuses and methods of this invention have been described in detail for the purpose of illustration, the inventive apparatuses and methods are not to be construed as limited thereby. This patent is intended to cover all changes and modifications within the spirit and scope thereof.

Industrial Applicability

The apparatus and method of the invention can be used as an ignition source for turbojet engines, internal combustion engines, diesel engines and gas turbines for electrical power generation.

What is claimed is:

1. An ignition apparatus comprising:
   (a) an excitation light source having the capability of producing two different wavelengths of light;
   (b) a first end of a first optical fiber positioned to collect output from said excitation light source;
   (c) a second end of said first optical fiber connected to an ignitor laser so as to permit transport of pulses of light from said excitation light source into said ignitor laser; and
   (d) a lens positioned to focus output of said ignitor laser into a combustible fuel.

2. An apparatus as recited in claim 1 wherein said excitation light source is a double Q-switched laser.

3. An apparatus as recited in claim 2 wherein said ignitor laser is a Nd:YAG laser.

4. An apparatus as recited in claim 2 wherein said excitation light source is a solid state double Q-switched Cr:LiSAF laser.

5. An apparatus as recited in claim 2 wherein said excitation light source is a solid state double Q-switched Ti:sapphire laser.

6. An apparatus as recited in claim 2 wherein said excitation light source is a solid state double Q-switched alexandrite laser.

7. An apparatus as recited in claim 1 wherein said ignitor laser has no pumping diodes or flashlamps.

8. An apparatus as recited in claim 1 wherein said excitation light source is remote from said ignition laser.

9. An apparatus as recited in claim 1 wherein said ignitor laser is proximate to fuel in an engine combustion chamber.

10. An apparatus as recited in claim 1 wherein said ignitor laser is proximate to fuel in the cylinder of an aircraft engine.

11. An apparatus as recited in claim 1 wherein said ignitor laser is proximate to fuel in a turbine engine .

12. An apparatus as recited in claim 1 further comprising a multiplexing device positioned to receive output from said excitation laser and to direct output sequentially into a plurality of optical fibers.

13. An apparatus as recited in claim 1 wherein said ignitor laser is a Q-switched Nd:YAG laser.

14. An apparatus as recited in claim 1 wherein said ignitor laser is a Q-switched Nd:glass laser.

15. An apparatus as recited in claim 1 wherein said ignitor laser is a Q-switched Nd:YLF laser.

16. An ignition apparatus comprising:
   (a) an excitation light source having the capability of producing two different wavelengths of light;
   (b) an optical switch positioned to receive output from said excitation light source and direct said output from said excitation light source sequentially into a plurality of ignitor lasers;
   (c) a plurality of optical fibers each of which is positioned to receive light from said optical switch and transport said light to each of said plurality of ignitor lasers; and
   (d) a plurality of lenses positioned to focus output of each of said ignitor lasers into a combustible fuel.

17. An apparatus as recited in claim 16 wherein said optical switch is based upon a rotatable prism.

18. An apparatus as recited in claim 16 wherein said optical switch is an electro-mechanical switch.

19. An apparatus as recited in claim 16 wherein said ignitor laser is proximate to fuel in an engine combustion chamber.

20. An apparatus as recited in claim 16 wherein said ignitor laser is proximate to fuel in the cylinder of an aircraft engine.

21. An apparatus as recited in claim 16 wherein said ignitor laser is proximate to fuel in a turbine engine.

22. An ignition method comprising:
 (a) generating a first beam of light with an excitation light source;
 (b) directing said first beam of excitation light from said excitation light source through a first optical fiber into an ignitor laser, causing output of a first ignitor laser beam;
 (c) generating with said excitation light source a second beam of excitation light having a wavelength different from the wavelength of said first beam of light;
 (d) directing said second beam of excitation light through said optical fiber into said ignitor laser, causing a second output of a second ignitor laser beam; and
 (e) directing output of said ignitor laser into a focal point in a combustible fuel.

23. A method as recited in claim 22 wherein said first beam of light has a wavelength which is substantially absorbable by lasing material in said ignitor laser and said second beam of light has a wavelength which is substantially not absorbable by lasing material in said ignitor laser.

24. A method as recited in claim 22 wherein said first beam from said excitation light source is a long duration low peak power pulsed beam.

25. A method as recited in claim 22 wherein said second beam from said excitation light source is a low peak power long duration pulsed beam.

26. A method as recited in claim 22 wherein said first beam from said excitation light source and said second beam from said excitation light source are of approximately the same intensity.

27. A method as recited in claim 22 wherein said first beam from said excitation light source has a wavelength in the range from about 200 nanometers to about 12 microns and said second beam from said excitation light source has a wavelength in the range from about 200 nanometers to about 12 microns.

28. A method as recited in claim 22 wherein said ignitor laser beam has a wavelength in the range from about 200 nanometers to about 12 microns.

29. A method as recited in claim 22 wherein said first beam of excitation light has a peak power in the range from about 10 W to about 50 MW and said second beam of excitation light has a peak power in the range from about 20 kW to about 40 MW.

30. A method as recited in claim 22 wherein said first beam of excitation light has a pulse energy in the range from about 10 mJ to about 500 mJ and said second beam of excitation light has a pulse energy in the range from about 10 mJ to about 400 mJ.

31. A method as recited in claim 22 wherein said first beam of excitation light has a pulse width in the range from about 10 nanoseconds to about 1 microsecond and said second beam of excitation light has a pulse width in the range from about 10 nanoseconds to about 1 microsecond.

32. A method as recited in claim 22 wherein said first ignitor laser beam has a wavelength in the range from about 200 nanometers to about 12 microns and said second ignitor laser beam has a wavelength in the range from about 200 nanometers to about 12 microns.

33. A method as recited in claim 22 wherein said first ignitor laser beam has a peak power in the range from about 25 kW to about 250 MW and said second ignitor laser beam has a peak power in the range from about 25 kW to about 250 MW.

34. A method as recited in claim 22 wherein said first ignitor laser beam has a pulse energy in the range from about 5 mJ to about 250 mJ.

35. A method as recited in claim 22 wherein said first ignitor laser beam has a pulse width in the range from about 1 nanosecond to about 200 nanoseconds.

36. A method as recited in claim 22 further comprising allowing a time interval in the range from about 25 nanoseconds to about 300 nanoseconds to occur between the end of said first beam of excitation light and the beginning of said second beam of excitation light.

37. A method as recited in claim 22 wherein said first and said second beams from said excitation light source are injected into a plurality of optical fibers using an optical switch which sequences the injections into said optical fibers.

* * * * *